E. HALMA.
SPEED CHANGING, REVERSING, AND BRAKING GEARING.
APPLICATION FILED JAN. 24, 1912.
1,049,577.
Patented Jan. 7, 1913.
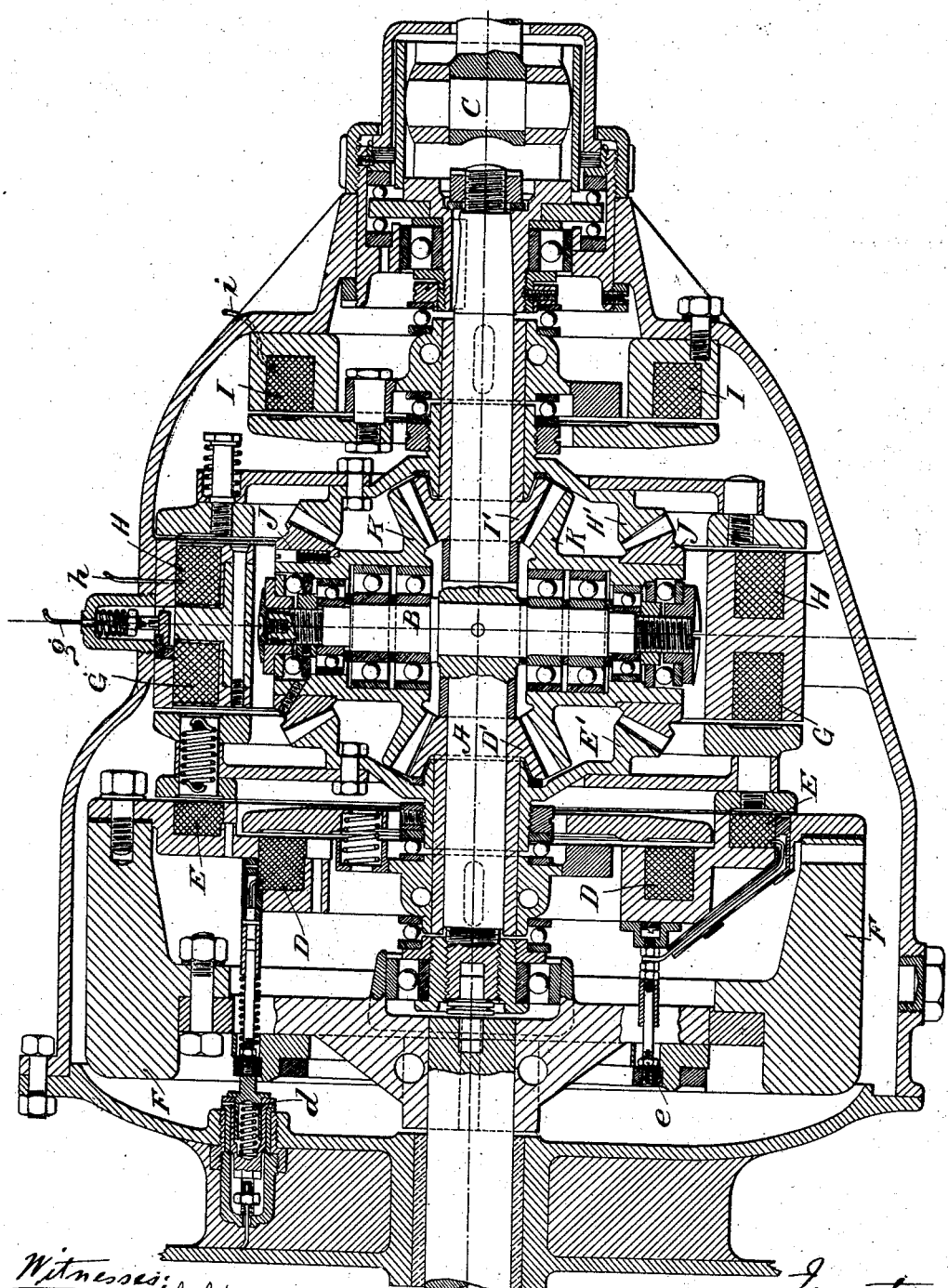

UNITED STATES PATENT OFFICE.

EDOUARD HALMA, OF PARIS, FRANCE, ASSIGNOR TO HIMSELF, GEORGES LOUIS OREL PERRET, AND LOUIS ISAAC MURISIER, OF PARIS, FRANCE.

SPEED CHANGING, REVERSING, AND BRAKING GEARING.

1,049,577. Specification of Letters Patent. Patented Jan. 7, 1913.
Application filed January 24, 1912. Serial No. 673,193.

*To all whom it may concern:*

Be it known that I, EDOUARD HALMA, of Paris, France, have invented a new and useful Improvement in Speed-Changing, Reversing, and Braking Gearing, More Especially Intended for Motor Road-Vehicles, which invention is fully set forth in the following specification.

This invention has for its object to provide speed-changing and reversing and braking gearing operated by electromagnetic means, the said gear comprising bevel toothed wheels which are always in gear and are arranged on shafts forming a cross and comprising also a spherical epicycloidal wheel train.

The improved gear comprises a series of magnetic clutches and brakes controlling, or rendering stationary, a part of the toothed gear of the epicycloidal system, so as to give either forward running, at the required speed, or backward running, or braking action.

I will describe this invention with reference to the accompanying drawing which represents in longitudinal section, gear constructed in accordance with this invention.

The gear comprises two shafts A and B, intersecting each other at right angles. The shaft B, receives its motion from the motor as hereinafter explained, and transmits this motion to the driven shaft A controlling the rear bridge of the vehicle through the medium of a Cardan joint C.

In order to obtain the various speeds in forward running, the reversal, or backward running, the direct engagement and the braking of the vehicle, a system of magnetic clutches and brakes is employed, this system comprising the magnetic clutches D and E in connection with the fly-wheel F and therefore rotating at the speed of a motor. It also comprises the magnetic brakes G H and I secured to the casing containing the mechanism so that these brakes G, H and I are always stationary. The magnetic clutches are supplied with current through any suitable rubbing contacts such as the spring contacts $d$, and $e$, while the magnetic brakes are supplied with current through the conductors $g$, $h$ and $i$. The said clutches and brakes are operated by the magnetic attraction of their corresponding disks which are connected with the bevel sun wheels $D^1$, $E^1$, $H^1$, $I^1$, which wheels are concentric with the shaft A, and are always in engagement with the planetary wheels J and K, which are integral with each other, or fixed together, and are mounted on the shaft B.

The operation of this speed changing gear, constructed as in the example illustrated, to give four speeds in forward running, one speed in backward running and braking action, is as follows: To obtain the first forward running speed, when the motor has been started, the current is sent through the clutch D, and brake H. The wheel $D^1$ then rotates at the same speed as the motor and the wheel $H^1$ is held stationary. The planetary wheel J integral with, or fixed to, the planetary wheels K, and operated by the wheel $D^1$, being constrained to rotate on themselves, react on the stationary wheel $H^1$, and cause the shaft B, and consequently the shaft A to move in the direction in which the motor rotates. The second forward-running speed is obtained either by sending the current through the clutch E, and the brake H, or by sending the current through the clutch D, and brake I, the first mode being preferred as causing less wear of the parts. The second speed thus obtained is equal to half the speed obtained in direct engagement. For the third forward-running speed, the current is supplied to the clutch E, and the brake I. In this case the wheel $E^1$, rotates at the speed of the motor and the pinion $I^1$, is stationary. The planetary wheels K integral with, or fixed to, the planetary wheels J being constrained to rotate on themselves, react on the stationary pinion $I^1$ and cause the shaft B, and consequently the shaft A, to move in the direction of rotation of the motor. The fourth forward-running speed can be obtained by passing the current through D and E, the planetary wheels J and K being thus jammed (the ratio of the numbers of teeth being different) and drivng the shaft B at the same speed as the clutches D and F, this speed corresponding to direct engagement. The reversal, or backward running, is obtained by causing the current to pass through the clutch D and the brake G. The wheel $D^1$ then runs at the speed of th motor while the wheel $E^1$ is rendered stationary. The planetary wheels J integral with, or fixed to, the planetary wheels K driven by the pinion $D^1$ are constrained to rotate on themselves and in this movement they react on the pinion $E^1$ which is stationary and then takes around the shaft B, and consequently the shaft A, in a direction opposite to that of the rotation of the motor. In this way any desired graduation of the speeds can be obtained by combining the ratios of the number of teeth which are in engagement in the pairs of bevel toothed wheels. The braking of the car is effected by passing the current through H and I. The planetary wheels J and K being thus rendered stationary on their pinions H¹ and I¹ prevent the shaft B, and consequently the shaft A, from moving and the vehicle stops. This braking action is comparable to the clutching for direct engagement. In all cases (and especially for braking) it is desirable to apply a gradually increasing current so as to avoid jerks.

The current required for the clutching and braking electro-magnets can be supplied from any suitable source of electricity. For example I employ a small dynamo of 12 volts and 15 amperes operated for instance by the arrangement usually employed for the lighting installation on ordinary vehicles, which dynamo will, without any addition, fulfil all the functions required for the perfect running of the vehicle and for internal and external lighting.

The hereinbefore described arrangement which is more especially applicable to motor road vehicles presents, over the hitherto known speed changing gears, the following advantages: It does away with cone and disk clutch gears which are always very complicated and easily get out of order. It does away with levers, supports, tubes, and rods required in other systems to alter the speed. It suppresses the sliding gear sleeve and the sudden engagement of the driving teeth which causes disagreeable noise and jerks injurious to the working members of the apparatus as hitherto constructed. The pinions with large teeth are small in number and are in constant engagement with one another. They do not therefore require being brought into gear, which bringing into gear has the defect of causing considerable wear on the working surface of the teeth.

The mechanism can be adapted to the motor so as to form a combination of reduced weight and occupying less space and facilitating the application to any chassis.

By introducing a resistance suitable for the electric current, it is possible to obtain in the various manipulations for altering the speed, reversing, and braking, any desired progressive action.

What I claim is:—

1. In an electromagnetic speed-change gearing, the combination of an epicycloidal wheel train having two shafts at right angles and fast to each other and a revoluble magnetic clutch adapted to engage one of the sun wheels of the train and a stationary magnetic brake adapted to act on another sun wheel of the train for the purposes described.

2. In an electromagnetic speed changing gearing, the combination of a drive shaft and a driven shaft, a planetary shaft fast thereto, two pairs of oppositely disposed sun gears loose on said driven shaft and planet gears loose on said planetary shaft and engaging said sun gears, a magnetic clutch on the drive shaft adapted to clutch either sun gear of one pair and a stationary magnetic brake adapted to engage one sun gear of the other pair thereby giving changes of speed or direction of the power driven shaft.

3. In an electromagnetic speed changing gearing, the combination of a drive shaft and a driven shaft, a planetary shaft fast thereto, two pairs of oppositely disposed sun gears loose on said driven shaft and planet gears loose on said planetary shaft engaging said sun gears, a magnetic clutch on the drive shaft adapted to clutch either sun gear of one pair and two stationary magnetic brakes adapted to engage the sun gears of the other pair thereby giving changes of speed or direction or braking of the power driven shaft.

4. In an electromagnetic speed changing gearing, the combination of a drive shaft and a driven shaft, a planetary shaft fast thereto, two pairs of oppositely disposed sun gears loose on said driven shaft and planet gears loose on said planetary shaft engaging said sun gears, a magnetic clutch on the drive shaft adapted to clutch either sun gear of one pair and two stationary magnetic brakes adapted to engage the sun gears of the other pair thereby giving changes of speed or direction or braking of the power driven shaft and a reversing magnetic brake adapted to engage and hold from rotation one of the clutch actuated sun gears.

5. In an electromagnetic change gearing the combination of a drive shaft and a driven shaft, a cross shaft fast thereto, an epicycloidal wheel train of gears loosely mounted on said driven shaft and cross shaft, an electromagnetic clutch between said drive shaft and said train to drive one or another of the gears on the drive shaft, an electromagnetic brake adapted to act on one or another of the gears on the driven shaft to vary the speed of the latter.

In witness whereof I have hereunto set hand in presence of two witnesses.

EDOUARD HALMA.

Witnesses:
  H. C. COXE,
  GABRIEL BELLIARD.

---

Copies of this patent may be obtained for five cents each, by addressing the "Commissioner of Patents, Washington, D. C."